March 19, 1935.  M. H. TUFT  1,995,160
ROD WEEDER
Filed June 4, 1934  2 Sheets-Sheet 1
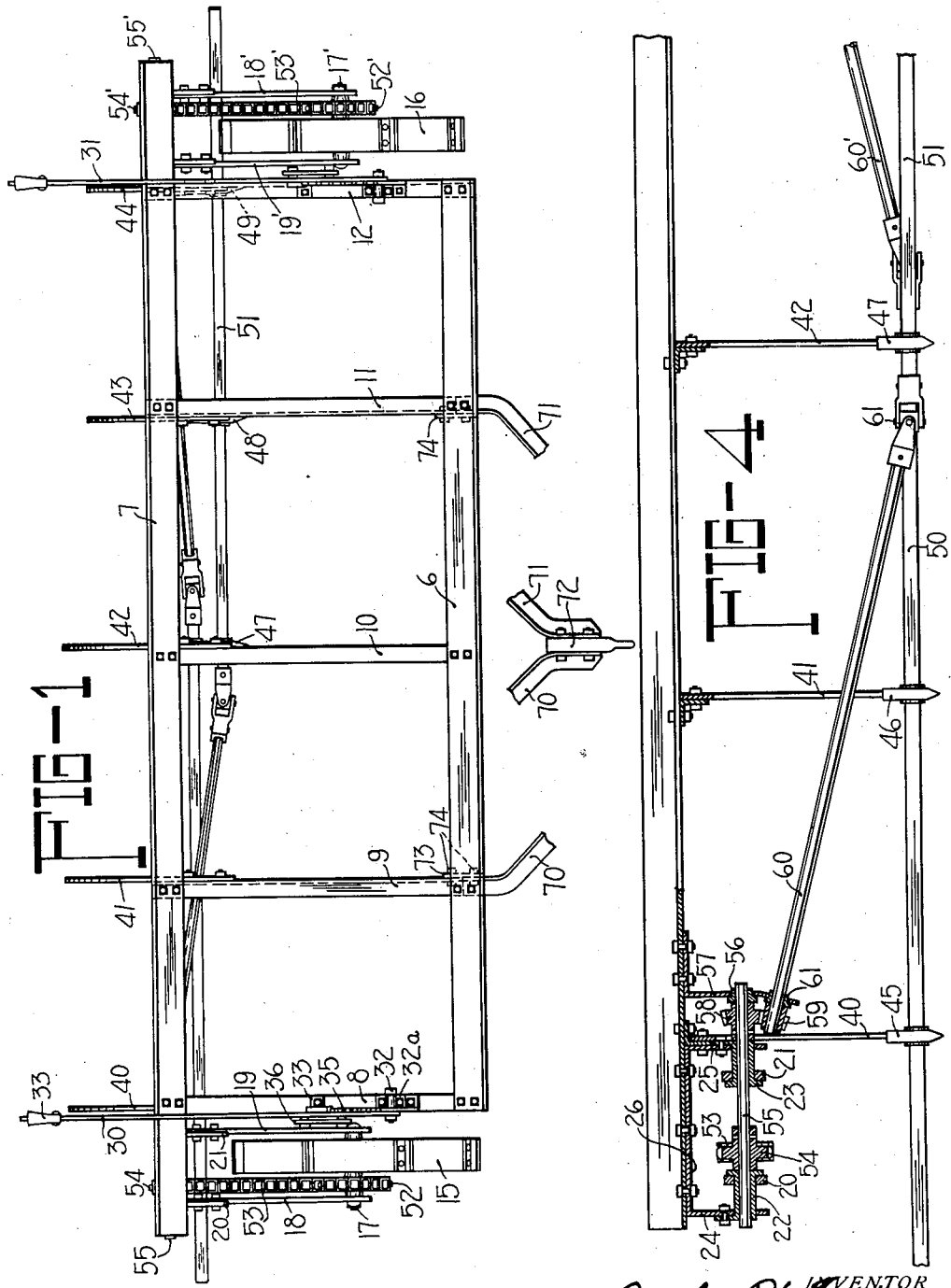

March 19, 1935.    M. H. TUFT    1,995,160
ROD WEEDER
Filed June 4, 1934    2 Sheets-Sheet 2
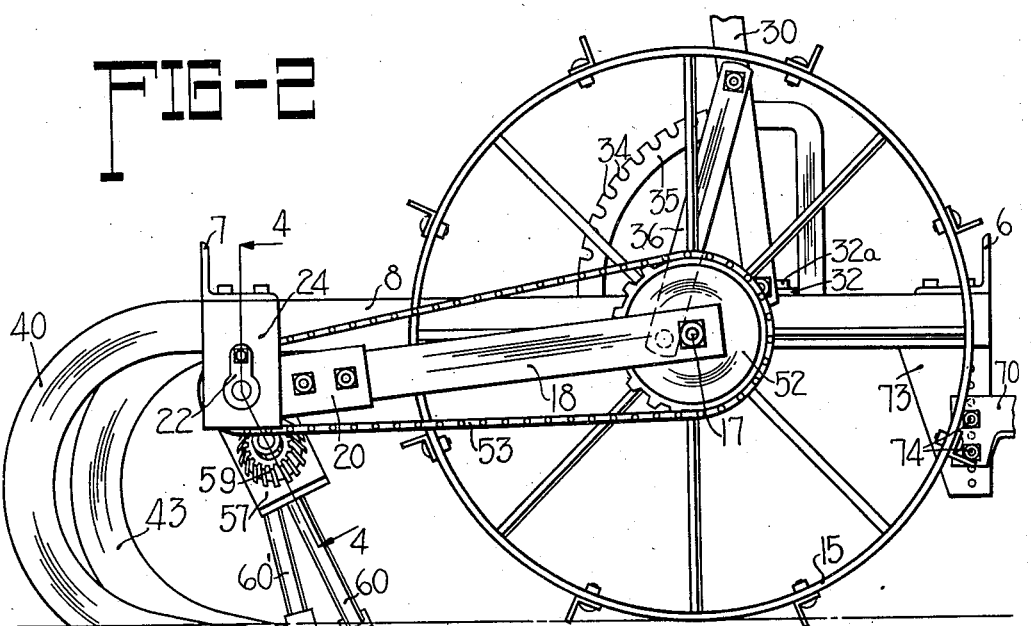
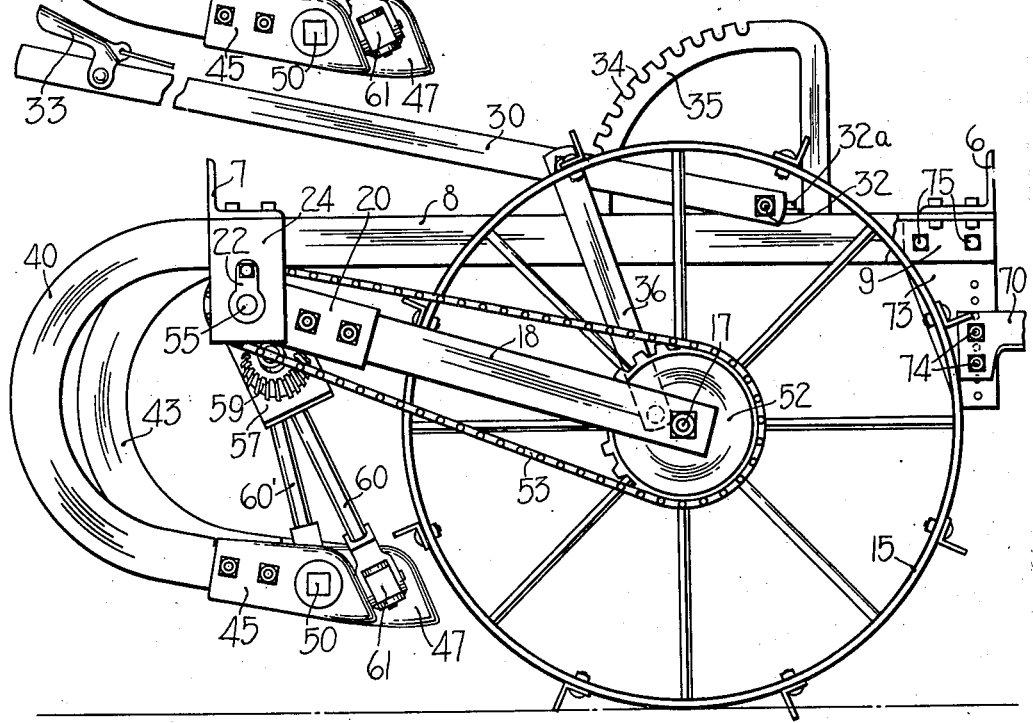

Patented Mar. 19, 1935

1,995,160

UNITED STATES PATENT OFFICE 1,995,160

ROD WEEDER

Miles H. Tuft, Rock Island, Ill., assignor to Deere & Company, Moline, Ill., a corporation of Illinois Application June 4, 1934, Serial No. 728,814

1 Claim. (Cl. 97—42)

This invention relates to rotary rod weeders; and the object of the invention is to provide a new and improved rod weeder of simplified construction. More specifically, the object of the invention is to provide a rod weeder in which the main carrying wheels from which power is derived to rotate the rotary rod are made adjustable and constitute the means to adjust the rod to different working depths and to raise the rod to transport position, the arrangement being such that when the rod is in a transport position, the wheel is disposed in close proximity to the rod and in a position in which the weight of the rod weeder is substantially balanced over the supporting wheels, and when the rod is in a working position, the wheel is disposed away from the rod to provide adequate clearance between the rod and the wheel for proper operation, yet is sufficiently close to the rod to serve as effective gauging means for the rod.

The manner in which these objects are accomplished is described in the following description of a preferred embodiment of my invention.

In the accompanying drawings illustrating such embodiment:

Figure 1 is a plan view;

Figure 2 is an end view showing the rod in working position;

Figure 3 is an end view showing the rod in transport position; and,

Figure 4 is a fragmentary cross-sectional view taken generally along the line 4—4 of Figure 2.

The frame of the implement comprises two transversely extending angle bars 6 and 7 which are cross-connected at spaced points by longitudinally extending angle bars 8 to 12 bolted to the under side of the transverse frame bars. The frame is supported upon two wheels 15 and 16 positioned at opposite sides of the frame. Wheel 15 is journaled on a spindle bolt 17 disposed between a pair of forwardly extending arms 18 and 19. Arms 18 and 19 are fixed at their rear ends to bearing members 20 and 21 which are journaled upon bearing members 22 and 23. Bearing members 22 and 23 are fixed to the arms 24 and 25 of a U-shaped bracket 26 supported from the under side of the end of frame bars 7, the latter extending beyond the ends of longitudinal member 8 for this purpose. Wheel 16 is similarly supported on a pivot bolt 17' disposed between a pair of forwardly extending arms 18' and 19' pivotally supported by the opposite end of frame member 7 extending beyond frame member 12.

The frame may be raised and lowered relative to wheels 15 and 16 by means of a pair of levers 30 and 31, one for each wheel. Lever 30 is pivotally connected by means of a pivot bolt 32 to a bracket 32a fixed to frame member 8 and is provided with the usual latch operated by hand grip 33 and cooperating with notches 34 in a sector 35 rising upwardly from and bolted to the top of frame member 8. Lever 30 is link-connected by means of a link 36 to the forward end of arm 19. Lever 31 is similarly mounted on frame member 12 and is similarly link-connected to arm 19'. Through the manipulation of levers 30 and 31 the implement may be raised and lowered relative to wheels 15 and 16.

Rigidly secured to the longitudinal bars 8 to 12 is a series of pendants 40 to 44 which extend rearwardly from the frame and are curved downwardly and forwardly. Pendants 43 and 44 are positioned slightly in advance of pendants 40, 41 and 42. The lower ends of the pendants are adapted to carry rotary rods and for this purpose are provided with shoe-like bearings or shoes 45 to 49. A rod 50 extends from a point just to the right of pendant 42 transversely to a point beyond the tread of carrying wheel 15 and is journaled in shoes 45, 46 and 47. Similarly, a second rod 51 spaced slightly in advance of rod 50, but for all practical purposes in substantially transverse alinement with rod 50, extends from a point just to the left of pendant 42 transversely to a point beyond the tread of wheel 16 and is journaled in shoes 47, 48 and 49. Shoes 45, 46, 48 and 49 may be of the type shown in Patent #1,873,552 granted to Frank T. Court under date of August 23, 1932. Shoe 47 is adapted to support both rods and may be of the type shown in Patent #1,877,652 granted to Charles H. Erwin under date of September 13, 1932.

Rod 51 is rotated by power derived from carrying wheel 15 and rod 50 is driven by power derived from carrying wheel 16. The driving mechanism for rod 51 comprises a sprocket wheel 52 suitably fixed to the hub of wheel 15. This sprocket is chain-connected by means of a sprocket chain 53 to a sprocket wheel 54 fixed on a jack shaft 55 journaled in bearings 22 and 23 and in a third bearing 56 supported in a bracket 57 depending from and fixed to the under side of frame member 7. Between bearings 23 and 56, a bevel gear 58 is fixed to shaft 55. Bevel gear 58 meshes with a companion bevel gear 59 fixed on the upper end of a downwardly and inwardly inclined tumbling shaft 60. The upper end of shaft 60 is journaled in a bearing 61 supported in a forwardly and outwardly bent depending extension of bracket 57. The lower end of tumbling shaft 60 is connected by means of a universal joint 61 to the inner end of rotating rod 51. The driving mechanism for rod 50 is substantially identical to the driving mechanism for rod 51 and it has therefore not been deemed necessary to show such mechanism in detail. Such parts as have been shown have been given the same numeral designations with primes added thereto as the corresponding parts of the driving mechanism for rod 51.

The implement is drawn by means of a draft device comprising forwardly converging angle members 70 and 71 fixed at their forward ends to a draft bar 72. At their rear ends members 70 and 71 are fixedly connected to depending plates 73 by means of bolts 74. Plates 73 depend from the forward ends of frame members 9 and 11 and are fixed thereto by means of bolts 75. Through this connection of the draft device with the implement frame, the draft device becomes a rigid forward extension of the frame.

Arms 18 and 19, and 18' and 19', are of a length relative to the diameter of wheels 15 and 16 such that when the frame is elevated to dispose the rods 50 and 51 in a transport position, the wheels will be disposed in close proximity to the rods and the weight of the rod weeder will be substantially balanced over the wheels. This positioning of the wheels is desirable for two reasons. With the wheels positioned in close proximity to the rods in transport position, it is not necessary to raise the rods as high for transporting as is necessary in such instances where the carrying wheels are spaced at a considerable distance from the rod to give ample clearance for the rods to clear obstructions when transporting, since the frame follows that contour of the ground more nearly directly over the rods. By reason of this location of the carrying wheels, which makes it unnecessary to raise the rods more than a few inches above the ground for transporting purposes, even with a simple form of raising and lowering device such as used in this implement, fine adjustment of the depth of the rod in its operating positions is obtained. In implements in which the carrying wheels are carried at a greater distance from the rods and in which it is necessary to raise the rods to a higher position to provide adequate clearance in transport, the range of movement of the frame relative to the wheels must be considerably greater. This makes it necessary to provide more complicated adjusting mechanisms to obtain the fine adjustments necessary within the operating range. With a machine substantially balanced over the supporting wheel when in transport, it is much easier to couple and uncouple the machine from the tractor since to lift the draft device to couple it to the drawbar of a tractor will require little or substantially no effort on the part of the operator.

The connection of the wheels with the frame is such that as the rod is lowered into operating position the wheels move forwardly and upwardly away from the rods to provide adequate clearance for the rods for proper operation. While, from the standpoint of accurately gauging the operating depth of the rods, it would be desirable to have the wheels much closer to the rod, it is necessary to provide certain clearance to allow free passage of the soil, weeds, etc., over the rod so that such material will not be caught between the rods and the wheels. It should also be noted that by journaling the supporting arms 18 and 19, and 18' and 19' on the drive shafts 51 and 51', a simple chain and sprocket connection to the drive shafts may be utilized without the need of employing a chain tightener or similar device, inasmuch as the sprockets 52 and 54, and sprockets 52' and 54' are maintained the same distance apart irrespective of the position of wheels 15 and 16 relative to the frame.

In the structure illustrated the drive shafts 55 and 55' have been disposed above but slightly to the rear of the general vertical plane of rods 50 and 51. This results in the tumbling shafts 60 and 60' being inclined forwardly at angles of about 15° and 25°, respectively. This positioning of tumbling shafts 60 and 60' aids in preventing clogging between the shafts and the rods. Weed trash which might otherwise tend to build up in front of tumbling shafts 60 and 60' now tends to move upwardly and rearwardly with the forward advance of the machine to the point where it is free to pass under the rods.

While I have illustrated my invention in connection with a machine employing two separate rods extending in opposite directions beyond the treads of the adjacent carrying wheels, the invention is also applicable to a weeder of the type having a single rod driven from one end.

What I claim is:—

A rod weeder comprising a frame, a hitch device fixed to and extending forwardly of said frame, pendants fixed to said frame, a weeder rod rotatably supported at the lower ends of said pendants, a drive shaft journaled on said frame above said rod, a driving connection between said drive shaft and said rod, and means to adjust said rod to different working depths and to raise said rod to a transport position, comprising a forwardly extending wheel support rockably mounted on said drive shaft for vertical swinging about an axis coincident with the axis of said drive shaft, a frame supporting wheel journaled on the end of said support, a sprocket fixed to said wheel, a sprocket fixed on said drive shaft, a driving chain trained over said sprockets, means for rocking said wheel support to vertically adjust the position of said frame, the length of said support relative to the diameter of said wheel being such that when said rod is in transport position, said wheel is disposed in close proximity to said rod in which position the weight of the rod weeder is substantially balanced over said wheel, and as said support is rocked to lower said rod to an operating position, said wheel is moved away from said rod to provide adequate clearance between the rod and the wheel for proper operation.

MILES H. TUFT.